UNITED STATES PATENT OFFICE.

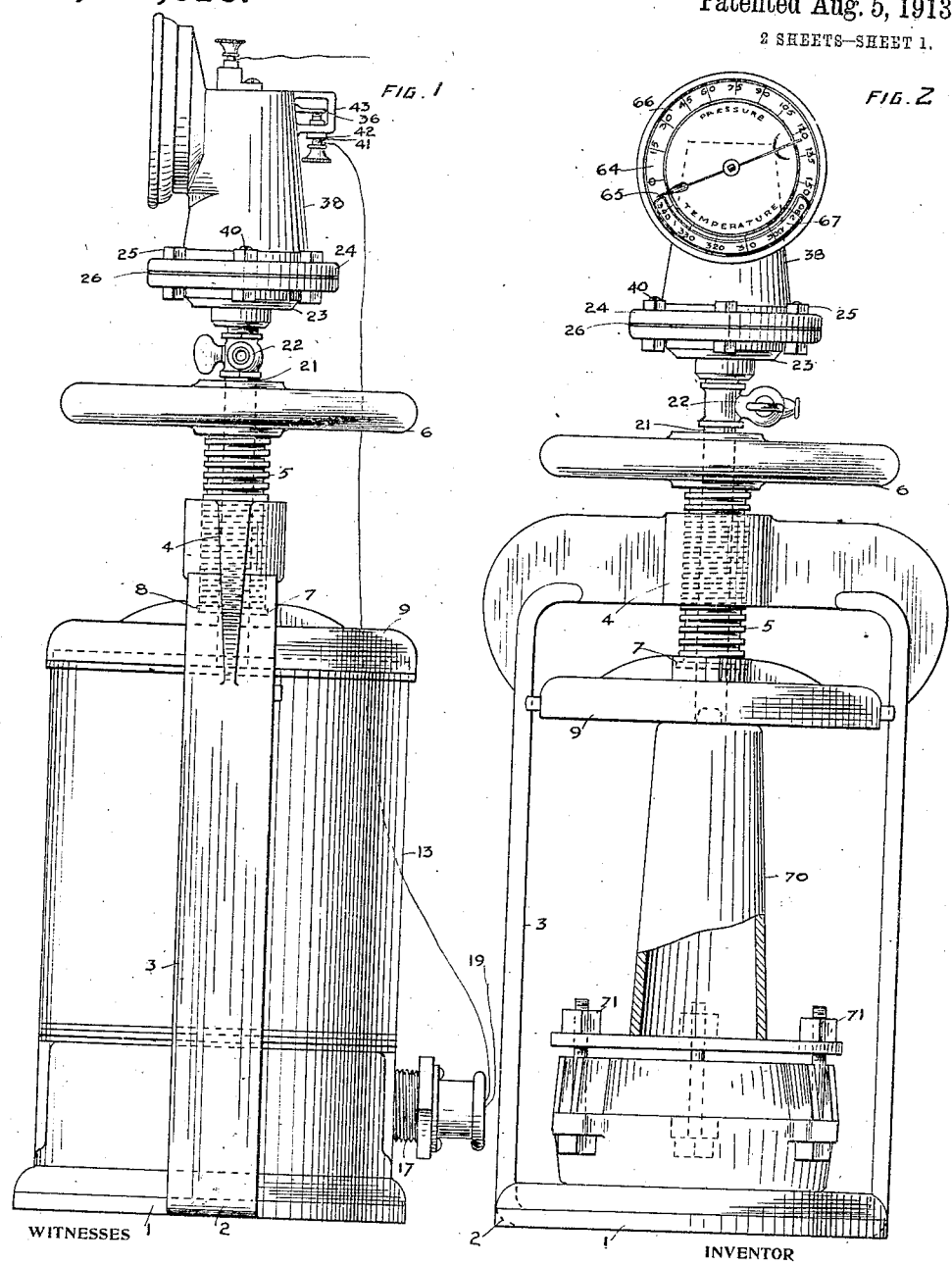

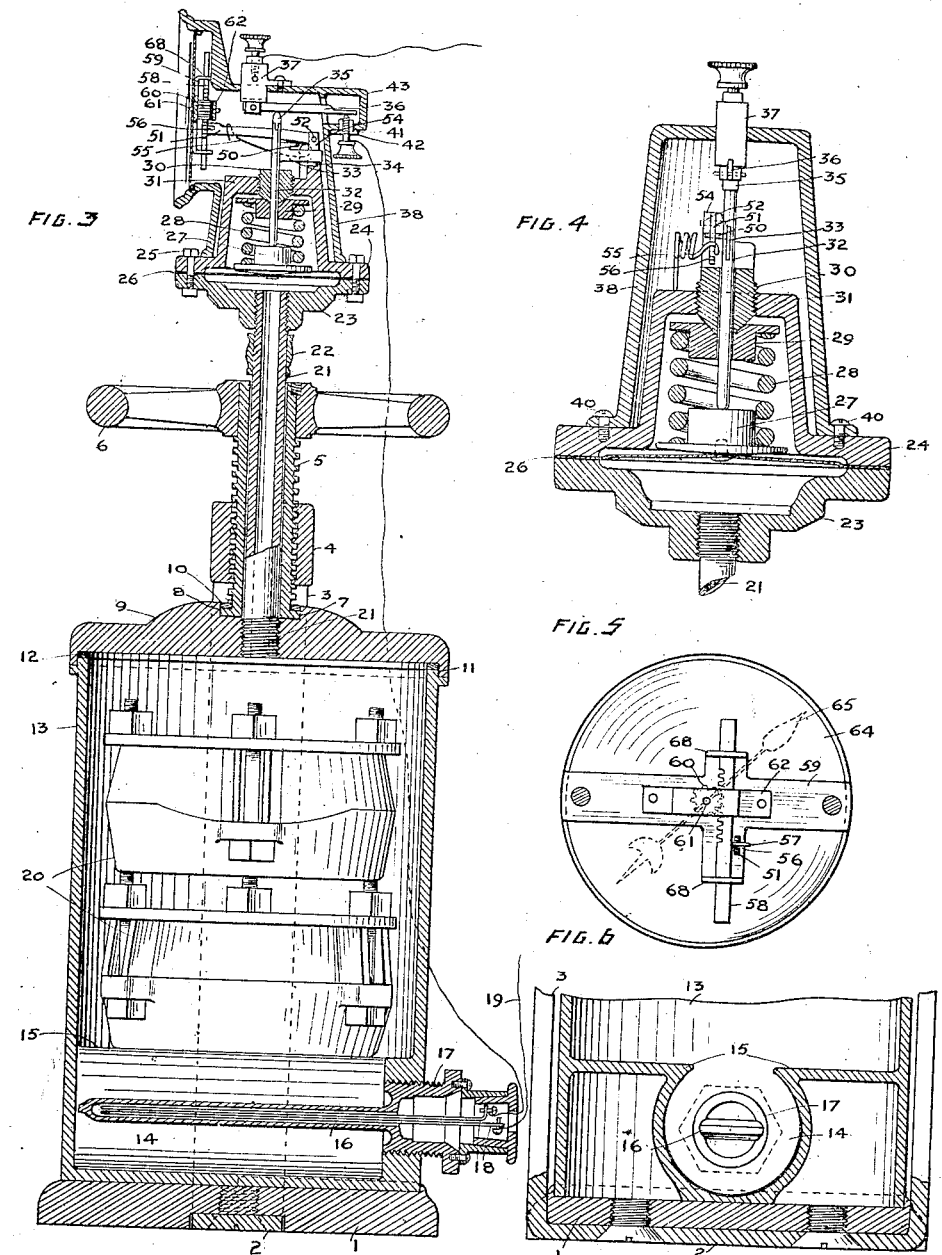

ANSEL C. HULBERT, OF SANTA ROSA, CALIFORNIA.

DENTAL VULCANIZER.

1,069,616.  Specification of Letters Patent.  Patented Aug. 5, 1913.

Application filed March 6, 1911. Serial No. 612,495.

*To all whom it may concern:*

Be it known that I, ANSEL C. HULBERT, a citizen of the United States, residing at Santa Rosa, in the county of Sonoma and State of California, have invented new and useful Improvements in Dental Vulcanizers, of which the following is a specification.

The present invention relates to dental vulcanizers, the object of the invention being to provide a vulcanizer of this character, in which the vulcanizing heat is automatically regulated with great accuracy, one which is convenient in operation and which may also be used as a flask press.

In the accompanying drawings, Figure 1 is a side view of my improved vulcanizer; Fig. 2 is a front view of the same when used as a dental press; Fig. 3 is a vertical section, showing the same in use; Fig. 4 is an enlarged vertical section of the upper portion of the apparatus taken at right angles to the section shown in Fig. 3; Fig. 5 is an enlarged front view, the dial being removed; Fig. 6 is a vertical section of the lower portion of the apparatus taken at right angles to Fig. 3.

Referring to the drawings, 1 indicates a base, screwed to which is a lower cross bar 2 of a frame having also two uprights 3, and a cross head 4, through which head 4 is screwed a hollow screw 5 turned by a hand wheel 6. The lower edge of the screw is formed with an outwardly extending flange 7 which enters a groove 8 formed in a circular cover 9, said groove being formed either by swaging an upper portion 10 to said cover, or screwing it thereto, after the flange has been inserted in said groove. The under surface of said cover is formed with a groove 11 adapted to receive a steam-gasket 12 to fit closely upon the top of a cylindrical vulcanizer pot 13. In the lower portion of said pot and extending transversely therethrough is a cylindrical heating chamber 14, open at the top, the walls of said chamber being connected to the walls of the pot by plates 15. Into said heating chamber can be inserted an electric heater 16, which is secured to a plug 17 of greater diameter than said heater, which plug is screwed through the wall of the pot and makes a tight fit therein. Terminals 18 from said electric heater can be connected by a wire 19 to any suitable source of supply of electricity. In said pot upon said plates can be supported one or two flasks 20. Into said cover is screwed a tube 21, which passes through the hollow screw 5 and to the top of said tube is connected, as shown, an escape valve 22 to allow escape of steam after the operation has been completed. Upon the upper end of said tube is secured a disk 23, between which and an upper disk 24 is clamped by means of screws 25 the edge of a diaphragm 26, to the upper surface of which diaphragm is secured a disk 27, which is depressed by a spring 28, the upper end of which abuts against a sleeve 29, into the upper side of which sleeve enters a lower conical end of a screw 30 screwed into an upper extension 31 of the disk 24. By screwing said screw into or out of said extension, the pressure of said spring 28 may be increased or diminished as required. Passing centrally through said sleeve and screw is a pin 32 having an arm 33, extending laterally therefrom and adapted to move in a vertical groove 34 and guiding said arm vertically. The upper end of said pin is provided with insulating material 35, which abuts against the under side of a lever 36, pivoted upon a binding post 37, provided with insulating material, which is secured in a dial casing 38 which surrounds the extension 31 and is secured to the upper disk 24 by screws 40. The free end of said lever normally rests upon a contact screw 41 which is screwed through a bushing 42 of insulating material secured in an extension 43 from said casing 38. The circuit through the electric heater passes in succession through said contacts 41 and 37. With this construction, if water be introduced into the chamber 14 and steam generated by the electric heater, when the pressure of steam arrives at a predetermined limit, determined by the pressure of the spring 28, the arm 36 is lifted from off the contact screw 41 and the circuit is broken. Heating then ceases until the steam has cooled below the desired temperature, when it re-commences. Simultaneously with the regulation of the electric current through the heater, the pressure and temperature of the steam in the pot are indicated by the following mechanism. The pin, 32 is also provided with an arm 50 extending at right angles to the arm 33, which passes beneath a lever 51 pivoted at 52 upon an extension 54, and is adapted to raise said arm against the pressure of a spring 55. The free end of said lever is slotted, as shown at 56, and engages a pin 57 upon a rack 58, which slides in vertical bearings 68 formed on a plate 59 secured to the dial casing 38. Said rack engages a pinion 60 on a shaft 61, having its bearings in said plate 59 and in a plate 62 secured thereto, and said shaft 61 carries on the outside of the dial 64 a pointer 65 for said dial. Said pointer is double-ended, the ends being adapted to move respectively over two circular series 66, 67, of numerals indicating respectively the pressure and the temperature of the steam in the steam chamber.

An important advantage attendant upon my invention is that it can be used as a flask press as well as a vulcanizer. For this purpose there is provided a slightly conical spacer 70, which, in order to compress the flask, is placed thereon, its upper end being adapted to be engaged by the cover 9. Upon screwing down the screw 5, a very great pressure can be brought to bear upon the top of the flask to close the same. The nuts 71 of the flask can then be screwed up to maintain the flask closed.

The mode of use of my apparatus will be readily understood from the foregoing description. The dentist, having filled the flask in the usual manner, places it in the press and compresses the same. He then screws up the nuts 71. He then places either one or two of said flasks in the pot pours water into the pot, and places the pot in position in the press. The head is then screwed down upon the pot to make it steam tight. The electric current is then turned on. The temperature to which the flask is subjected can be regulated to within less than half a degree of the desired temperature and it may be maintained at this temperature for any length of time desired. It is intended that a clock be used to cut out the electric current at the end of the period of vulcanization but this arrangement forms no part of my invention.

The double dial and double pointer form a feature of my invention of great merit, as they obviate the necessity of the dentist having to consult tables or the like to ascertain the temperature from the pressure or conversely.

I claim:—

1. An electrically-heated vulcanizer, comprising a flask-containing pot, a removable closure therefor, said pot having a support for a flask, a heating compartment beneath said support, an opening in the wall of said heating compartment, a closure for said opening, and an electric heater carried by said closure and extending into said compartment, said support being provided with an opening to form a communication between said heating-compartment and the main chamber of the pot.

2. A vulcanizer comprising a pot, a movable closure therefor, a base, a frame rigidly connected with said base and having a cross head, a tubular screw screwed through said cross head and connected with the closure, a steam tube connected with said closure and passing therethrough, an electric heater in said pot, an electric circuit breaker in the circuit through said heater, a spring-repressed diaphragm secured throughout its periphery and adapted to prevent the escape of the steam through said tube, and means actuated by the movement of said diaphragm for operating said circuit breaker.

3. A vulcanizer comprising a pot, a movable closure therefor, a base, a frame rigidly connected with said base and having a cross head, a tubular screw screwed through said cross head and connected with the closure, a steam tube connected with said closure and passing therethrough, an electric heater in said pot, an electric breaker in the circuit through said heater, a spring-repressed diaphragm secured throughout its periphery and adapted to prevent the escape of the steam through said tube, a spring pressing said diaphragm against the pressure of said steam, and means actuated by the movement of said diaphragm for operating said circuit breaker.

4. A vulcanizer comprising a pot, a movable closure therefor, a base, a frame rigidly connected with said base and having a cross head, a tubular screw screwed through said cross head and connected with the closure, a steam tube connected with said closure and passing therethrough, an electric heater in said pot, an electric circuit breaker in the circuit through said heater, a spring-repressed diaphragm secured throughout its periphery and adapted to prevent the escape of the steam through said tube, a pin moved by said diaphragm when actuated by the steam pressure, two levers rocked by the movement of said pin, one of which breaks said circuit, and a gage actuated by the other lever.

5. A vulcanizer comprising a pot, a movable closure therefor, a base, a frame rigidly connected with said base and having a cross head, a tubular screw screwed through said cross head and connected with the closure, a steam tube connected with said closure and passing therethrough, an electric heater in said pot, an electric circuit breaker in the circuit through said heater, a spring-repressed diaphragm secured throughout its periphery and adapted to prevent the escape of the steam through said tube, a pin moved by said diaphragm when actuated by the steam pressure, two levers rocked by the movement of said pin, one of which breaks said circuit, and a gage actuated by the other lever, said levers being supported by said pin.

In testimony whereof I have hereunto set my hand in the presence of two subscribing witnesses.

ANSEL C. HULBERT.

Witnesses:
 FRANCIS M. WRIGHT,
 D. B. RICHARDS.